United States Patent
Rich et al.

(10) Patent No.: US 8,822,096 B2
(45) Date of Patent: Sep. 2, 2014

(54) FUEL CELL ELECTRICAL POWER SOURCE FOR A PORTABLE ELECTRONIC DEVICE WITH THERMOELECTRIC MODULE

(75) Inventors: David Gerard Rich, Waterloo (CA); Lyall Kenneth Winger, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 524 days.

(21) Appl. No.: 12/963,999

(22) Filed: Dec. 9, 2010

(65) Prior Publication Data
US 2012/0148879 A1  Jun. 14, 2012

(51) Int. Cl.
  *H01M 8/04* (2006.01)
(52) U.S. Cl.
  USPC .............. 429/442; 429/9; 429/428; 429/434; 429/435
(58) Field of Classification Search
  None
  See application file for complete search history.

(56) References Cited

U.S. PATENT DOCUMENTS

| | | | |
|---|---|---|---|
| 6,461,752 B1 | 10/2002 | Leung | |
| 7,405,013 B2 | 7/2008 | Yang et al. | |
| 2005/0112436 A1 | 5/2005 | Jeffcoate | |
| 2005/0271916 A1 | 12/2005 | Yang et al. | |
| 2006/0003193 A1 | 1/2006 | Stabler et al. | |
| 2006/0024544 A1* | 2/2006 | Nielsen et al. | 429/26 |
| 2006/0157102 A1 | 7/2006 | Nakajima et al. | |
| 2006/0216559 A1 | 9/2006 | Olivier et al. | |
| 2006/0292411 A1* | 12/2006 | Cho et al. | 429/26 |
| 2008/0311466 A1* | 12/2008 | Yang et al. | 429/62 |
| 2009/0239108 A1* | 9/2009 | Miyauchi et al. | 429/13 |
| 2009/0297895 A1 | 12/2009 | Mclean et al. | |

FOREIGN PATENT DOCUMENTS

JP    11111322    4/1999

OTHER PUBLICATIONS http://www.nodium.com/articles/463 xml-test-2, "Thermo Electric Mobile Charger", posted on internet site Jan. 23, 2008.
Stanford Ovshinsky, Kevin Fok, Srinivasan Venkatesan adn Dennis Corrigan, "Metal Hydride Fuel Cells for Ups and Emergency Power Applications", undated.

* cited by examiner

*Primary Examiner* — Milton I Cano
*Assistant Examiner* — Carmen Lyles-Irving
(74) *Attorney, Agent, or Firm* — Bereskin & Parr LLP

(57) ABSTRACT

An electrical power source for a portable electronic device. The electrical power source includes at least one fuel cell adapted to receive fuel and generate therefrom electrical power for powering at least one component of the portable electronic device, a fuel tank adapted to provide fuel to the fuel cell, and at least one thermoelectric module in thermal contact with at least one of the fuel cell and fuel tank for regulating the temperature of the at least one fuel cell and at least one fuel tank.

5 Claims, 5 Drawing Sheets

FUEL CELL ELECTRICAL POWER SOURCE FOR A PORTABLE ELECTRONIC DEVICE WITH THERMOELECTRIC MODULE

FIELD

Embodiments herein relate generally to the field of fuel cells and more particularly to fuel cells for portable electronic devices having at least one thermoelectric module.

INTRODUCTION

Fuel cells have received significant attention in recent years due to their potential benefits for electricity generation with relatively low environmental impact. The basic principles of fuel cells have been understood for a long time, but they have yet to see widespread use due to a number of challenges, including their size, relatively high cost of production and the difficulty in managing their operation.

Generally, a fuel cell is an electrochemical conversion device that produces electricity from a reaction between a fuel and an oxidant in the presence of an electrolyte. In operation, the fuel and the oxidant flow into the fuel cell, thereby producing electricity and a residue that flows out. For example, in the case of a hydrogen fuel cell, hydrogen is used as the fuel and oxygen (or air) is used as the oxidant, while water is produced as a residue (either liquid or gaseous).

Unlike batteries that chemically store electrical energy, fuel cells consume reactants to produce electrical energy, thus requiring replenishment to maintain the reaction. Therefore, a fuel cell is normally accompanied by a fuel tank to store and provide fuel as needed.

Depending on the type of fuel being used in a particular fuel cell, the operating temperature of the fuel cell and associated fuel tank can vary greatly. In some instances, the fuel cell and fuel tank may not operate properly or with a desired efficiency when outside of a particular temperature range. Furthermore, when the temperature of a fuel cell or fuel tank is sufficiently low, icing problems can occur which interfere with the operation of the fuel cell. Temperature problems may be particularly problematic when a fuel cell is being operated in hot or cold environments.

BRIEF DESCRIPTION OF THE DRAWINGS

For a better understanding of embodiments described herein, and to show more clearly how they may be carried into effect, reference will now be made, by way of example, to the accompanying drawings.

DETAILED DESCRIPTION

Figure 1:
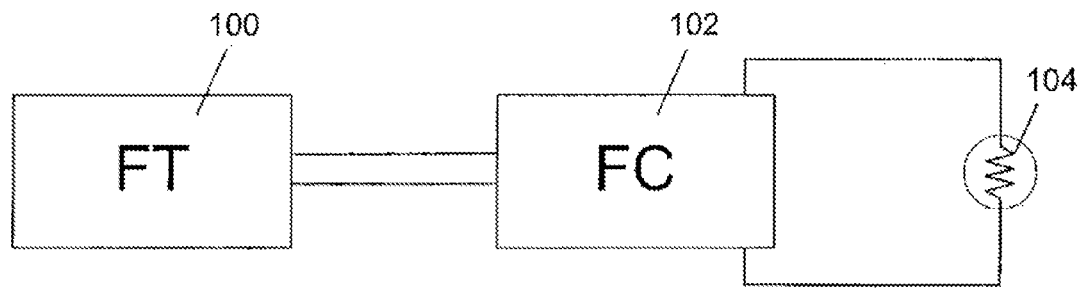
FIG. 1 is a schematic view of a fuel cell powering an electrical load and having a fuel tank.

Turning to FIG. 1, illustrated therein is an introductory overview of a system that will be described in further detail below. FIG. 1 depicts a fuel cell 102 physically coupled to and powering an electric load 104. The electric load 104 may be representative of any one or more electronic components (e.g. a processor, memory, display, battery, wireless transmitter, wireless receiver, lighting element, etc.) of any number of portable electronic devices, such as a mobile phone, a smart phone, a personal digital assistant, a portable video game console, a tablet computer, a media player, and so on. Many such devices are handheld devices, that is, they are sized or shaped (or both) to be held in one or more human hands.

As shown, the fuel cell 102 is physically coupled to one or more fuel tanks 100, such that the fuel cell 102 is adapted to receive fuel (or is capable of receiving fuel) from one or more fuel tanks 100.

Turning now to FIGS. 2 to 7, generally described herein are electrical power sources for portable electronic devices. Each electrical power source includes at least one fuel cell, at least one fuel tank, and at least one thermoelectric module. Each thermoelectric module may be sized and shaped to exchange heat with at least one of the fuel cells and fuel tanks. For example, a thermoelectric module may be operable to receive heat from a fuel cell or fuel tank and in turn generate electrical power (in other words, a thermoelectric module may in operation receive heat energy as an input and produce electrical energy as an output). In other instances, a thermoelectric module may receive electrical power (e.g. from a battery) and in turn generate heat for heating one or more of the fuel tank and fuel cell.

In some embodiments, one or more thermoelectric modules may be in thermal contact with one or more of a fuel tank or fuel cell (or both). As used herein, the expression "in thermal contact" generally includes all direct and indirect relationships that allow for conductive heat transfer between two bodies. For example, a first surface of a thermoelectric module may be in direct physical contact with a second surface on a fuel tank, allowing heat transfer via conduction between the thermoelectric module and the fuel tank.

In some embodiments, heat transfer may occur via other modes, such as convection and radiation. For example, one or more thermoelectric modules may be operable to exchange heat with one or more fuel cells and fuel tanks, but not be in physical contact therewith (e.g. the thermoelectric modules may be spaced apart from the fuel cell or fuel tank but be sized and shaped to still allow convection and radiation therebetween).

In some embodiments, in an electrical power source a thermoelectric module is placed in thermal contact with a fuel cell. The thermoelectric module may receive heat generated by the fuel cell, and use that heat to generate electrical power that may then be used by the portable electronic device (e.g. to charge a battery, power a processor, a memory, a display, etc.). In some cases, at least some of the generated electrical power may be stored in an energy storage element (e.g. a battery, a capacitor, a super-capacitor, or any other type of energy storage system). In various examples, the energy storage element could be an energy storage element of the electronic device (e.g. the battery), a charger for the electronic device, an optional energy storage element (e.g. a removable peripheral), and so on. In some examples, at least some of the generated electrical power may be fed directly to one or more electronic components of the portable electronic device without being stored.

In some embodiments, electrical power may be provided to a thermoelectric module to generate heat for heating a fuel cell. Such heat may be particularly useful for "de-icing" one or more components of the electronic device, bringing the fuel cell temperature or fuel tank temperature (or both) up to a desired operating temperature, and so on. This may be particularly beneficial when the fuel cell is in a portable electronic device and is operating in cold environmental conditions.

In some embodiments, a thermoelectric module may be placed in thermal contact with a fuel tank. For example, the thermoelectric module may be used to generate electrical power using heat drawn from the fuel tank. Alternatively, the thermoelectric module may be powered by electrical power to generate heat for heating the fuel tank (e.g. for de-icing the fuel tank).

In some embodiments, at least one separate thermoelectric module may be used for at least some fuel cells and fuel tanks. This may allow the temperature of at least one of the fuel cells and fuel tanks to be controlled independently.

In some embodiments, at least one shared thermoelectric module may be placed in thermal contact with both a fuel cell and a fuel tank, or more than one fuel cell, or more than one fuel tank. In some such examples, the shared thermoelectric module may be used to provide relative heating or cooling (or both) between a fuel cell and a fuel tank. For example, a shared thermoelectric module may provide heat to a fuel cell while absorbing heat from a fuel tank. Alternatively, a shared thermoelectric module may provide heat to a fuel tank while absorbing heat from a fuel cell.

In some embodiments, a shared thermoelectric module may draw heat from both a fuel tank and a fuel cell to generate electricity, or may heat both the fuel tank and the fuel cell.

In some embodiments, a plurality of fuel cells and a plurality of fuel tanks may be in thermal contact with a plurality of thermoelectric modules. One or more of the thermoelectric modules may be in thermal contact with only one fuel cell or one fuel tank, with multiple fuel cells or fuel tanks, or with both one or more fuel cells and one or more fuel tanks.

In some embodiments, various combinations of thermoelectric modules, fuel cells and fuel tanks may be used according to the operating characteristics of a desired application. For example, multiple fuel cells and fuel tanks may be arranged in a stacked configuration wherein one or more thermoelectric modules are interspersed or "sandwiched" between fuel cells and fuel tanks, which may provide desired operating conditions in a relatively small space.

In some embodiments, a controller may be used to control one or more thermoelectric modules. For example, a controller may monitor the temperature of the fuel cells or fuel tanks (or both), and regulate one or more associated thermoelectric modules accordingly. In particular, in a configuration with multiple fuel cells and fuel tanks, the controller may monitor the temperatures of the fuel cells and fuel tanks and regulate the thermoelectric modules so that the temperatures of the fuel cells and fuel tanks are within a desired operating range.

In some embodiments, the controller may monitor one or more surrounding temperatures in the portable electronic device (e.g. the temperature of one or more components of the portable electronic device, the temperature of the ambient air, etc.) and may adjust the regulation of the thermoelectric modules in response to the measured temperatures.

In some embodiments, one or more pairs of electrically interconnected thermoelectric modules may be used. For a given pair, one thermoelectric module may be in thermal contact with the fuel cell, while the other thermoelectric module may be in thermal contact with the fuel tank. In some examples, a pair of thermoelectric modules may use heat generated by the fuel cell to extend an operating range of the fuel tank, or vice versa.

Figure 2:
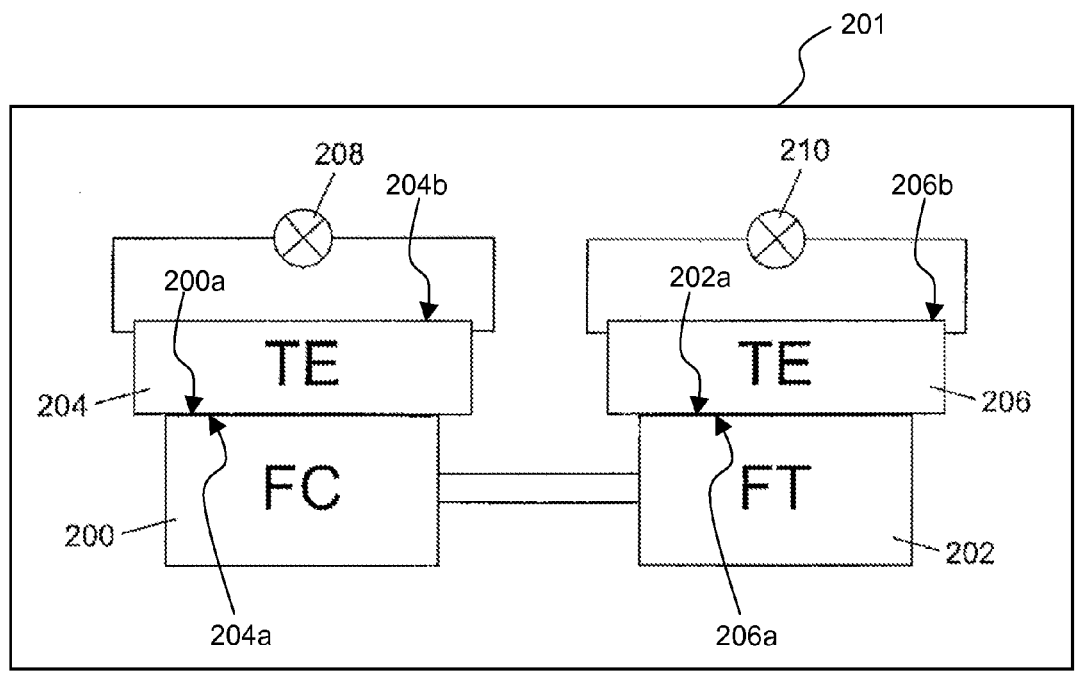
FIG. 2 is a schematic view of a portable electronic device having a fuel cell and a fuel tank therein, each of the fuel cell and fuel tank in thermal contact with a thermoelectric module.

Turning now specifically to FIG. 2, shown therein is a schematic view of an electric power source (in a portable electronic device 201) having a fuel cell 200 and fuel tank 202. Each of the fuel cell 200 and fuel tank 202 has an adjacent thermoelectric (TE) module (e.g. a first TE module 204 in thermal contact with the fuel cell 200, and a second TE module 206 in thermal contact with the fuel tank 202).

Generally, each TE module 204, 206 has a hot side and a cold side. The difference in temperature between the hot side and the cold side of a TE module generates electrical power according to a phenomenon described as the "Peltier effect". In particular, the electrical power generated by each TE module 204, 206 is generally relative to the temperature difference between the hot side and the cold side of each TE module 204, 206.

By placing the hot side of each TE module 204, 206 in thermal contact with a relatively hot body or surface (e.g. the fuel cell 200 or fuel tank 202), and the cold side in thermal contact with a relatively cooler body or surface (e.g. ambient air), the TE modules 204, 206 may be used to generate electrical power.

For example, as shown in FIG. 2, the first TE module 204 is adjacent to and in thermal contact with the fuel cell 200 (e.g. at least one surface 200a of the fuel cell 200 is in direct physical contact with at least one surface 204a of the first TE module 204). At least one other side 204b of the TE module 204 is in thermal contact with another generally cooler body or surface, such as the ambient atmosphere, or another heat sink.

Similarly, the second TE module 206 is adjacent to and in thermal contact with the fuel tank 202 (e.g. at least one surface 202a of the fuel tank 202 is in contact with at least one surface 206a of the second TE module 206). As with the first TE module 204, at least one other surface 206b of the second TE module 206 is in thermal contact with a cooler body, such as the ambient atmosphere.

As shown, the first TE module 204 has a set of electrical leads shown connected to a first electrical node 208, and the second TE module 206 also has a set of electrical leads shown connected to a second electrical node 210. Generally, the electrical nodes 208, 210 may be electrically coupled to or representative of one or more electronic components (e.g. a processor, a memory, a battery, a display, a wireless transmitter or other load, etc.) of the portable electronic device 201. In some embodiments, the electrical nodes 208, 210 could include one or more power supplies for powering the TE modules 204, 206.

Generally, the use of TE modules with fuel cells and fuel tanks may provide various advantages depending on the operating conditions of the electrical power source. For example, on embodiment is shown schematically in FIG. 3. In this particular aspect, at least one TE module is used to provide heating of a fuel cell 300 and a fuel tank 302. This may be particularly useful during a startup condition when at least one of the fuel cell 300 and fuel tank 302 may be too cold to operate efficiently.

In fact, under certain low temperature conditions, ice may form in the vicinity of the fuel tank 302 or the fuel cell 300 (or both). Generally, this ice should be thawed before the fuel cell 300 is operated to generate electrical power.

Figure 3:
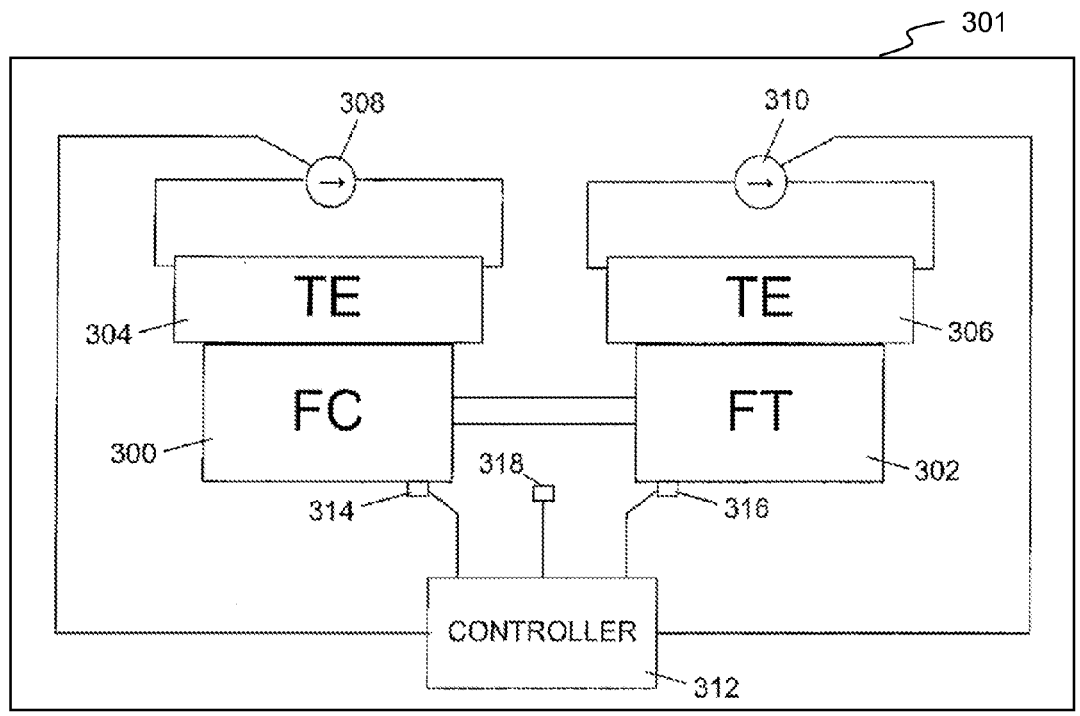
FIG. 3 is a schematic view of a fuel cell and fuel tank, each in thermal contact with a separate thermoelectric module, and including a controller for controlling the thermoelectric modules.

As shown in FIG. 3, an electric power source (in a portable electronic device 301) has a fuel cell 300 and fuel tank 302. Each of the fuel cell 300 and the fuel tank 302 has its own TE module (e.g. a first TE module 304 and second TE module 306). The first TE module 304 is associated with the fuel cell 300 and the second TE module 306 is associated with the fuel tank 302. Furthermore, in this embodiment the first TE module 304 is in direct thermal contact with the fuel cell 300 and the second TE module 306 is in direct thermal contact with the fuel tank 302.

In some embodiments, a single TE module might be used to heat both the fuel cell 300 and fuel tank 302, or one or the other of the fuel cell 300 and fuel tank 302 might have a TE module associated therewith while the other has none.

However, in the configuration shown in FIG. 3, the use of individual or separate TE modules 304, 306 for the fuel cell 300 and fuel tank 302 may allow the fuel cell 300 and fuel tank 302 to be heated at different rates and to different target temperatures. This may be particularly beneficial since the desired operating temperatures of the fuel cell 300 and fuel tank 302 may be different. Thus, independently heating the fuel cell 300 and fuel tank 302 may tend to provide a more precise and efficient electrical power source.

In some embodiments, the TE modules 304, 306 are powered, respectively, by power supplies 308 and 310. The power supplies 308, 310 could be one or more batteries.

In some embodiments, the TE modules 304, 306 may be controlled by a controller 312. In particular, the controller 312 may be used to control the power supplied to the TE modules 304, 306 from the power supplies 308, 310. In some embodiments, the controller 312 may include a microprocessor, a microcontroller, or other suitable types of control devices.

In the embodiment shown in FIG. 3, the controller 312 may receive one or more signal inputs from one more sensors 314 and 316. For example, the sensors 314, 316 may be temperature sensors that measure the temperature of the fuel cell 300 and fuel tank 302. In some embodiments, the controller 312 may also have an ambient temperature sensor 318 for monitoring the temperature of the ambient air, and other sensors (e.g. a humidity sensor, a pressure sensor, etc.).

In general, a temperature sensor generates a temperature signal as a function of a detected temperature. The temperature signal may be a function of whether the detected temperature is above or below a threshold (or reference) temperature, or in a range of temperatures, for example. Other sensors may function similarly (e.g. a humidity sensor may generate a humidity signal as a function of detected humidity, a pressure sensor may generate a pressure signal as a function of detected pressure, and so on). The controller 312 may use these signals to monitor the various parameters.

In some embodiments, in response to the signals received from the sensors 314, 316, 318, the controller 312 may generate and send control signals to the power supplies 308 and 310 to initiate one or more heating cycles for the TE modules 304, 306. Thus, when the fuel cell 300 or fuel tank 302 (or both) are too cold (e.g. below a desired operating temperature), such as during a start up condition, a heating cycle from the corresponding TE module 304, 306 may be used to bring the fuel cell 300 and fuel tank 302 to the desired operating temperatures.

In addition to providing heating to the fuel cell 300 and fuel tank 302, the configuration shown in FIG. 3 may also be used for cooling one or more components. In particular, the TE modules 304, 306 may be used as cooling elements by reversing the polarity of the power supplies 308, 310. Thus, if the temperature of the fuel cell 300 or the temperature of the fuel tank 302 (or both) rises above a desired temperature threshold, the controller 312 may be used to control the power supplies 308, 310 to provide a power to its respective TE module 304, 306 so as to provide cooling to those sides of the TE module 304, 306 that are in thermal contact with the fuel cell 300 or fuel tank 302, respectively.

For example, in some embodiments the fuel cell 300 may be a direct methanol fuel cell (DMFC) configured to operate with a desired temperature of between around 10 degrees Celsius and 70 degrees Celsius, or at other temperatures. In some embodiments the fuel cell 300 may be a proton exchange membrane (PEM) fuel cell configured to operate with a desired temperature of between around 10 degrees Celsius and 70 degrees Celsius, or at other temperatures. In yet other embodiments, the fuel cell 300 may be a solid oxide fuel cell (SOFC) configured to operate with a desired temperature of between above around 600 degrees Celsius and in some cases above around 800 degrees Celsius.

Referring again to FIG. 2, there is shown another aspect of an electrical power source wherein either or both of the electrical nodes 208, 210 may include a circuit for receiving electrical power from its respective TE module 204, 206. That is, if the temperature of the fuel cell 200 or fuel tank 202 is sufficiently different from the ambient temperature, the TE modules 204, 206 will tend to absorb heat and generate electrical power therefrom that may be used by the portable electronic device. Generally, this electrical power may be directly applied to ongoing device operation (e.g. to power a display, a memory, etc), or it may be stored in an energy storage device (e.g. a battery) for subsequent use.

Figure 4:
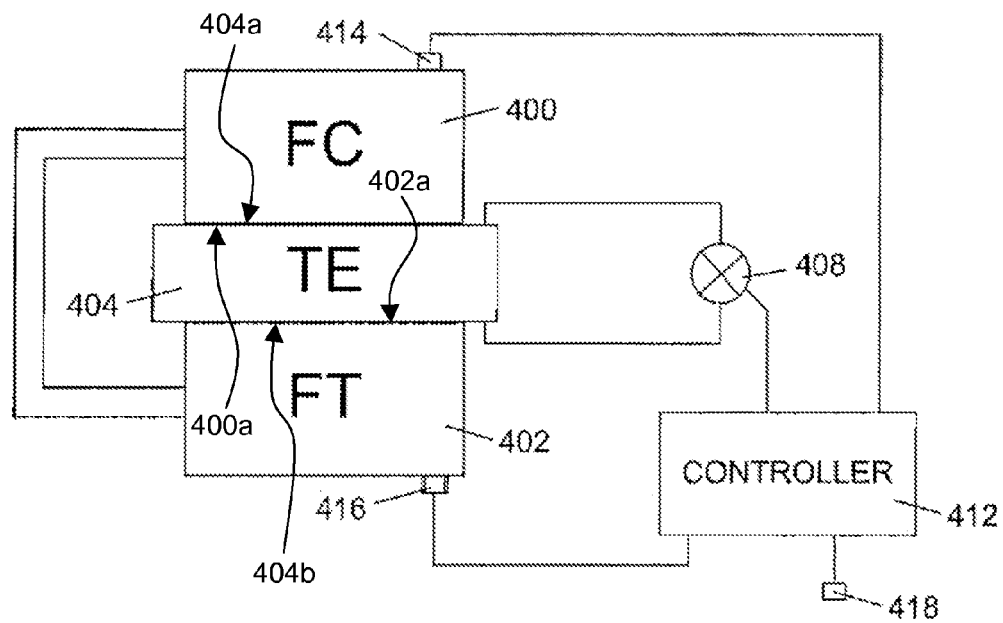
FIG. 4 is a schematic view of a fuel cell and fuel tank in thermal contact with a shared thermoelectric module.

Another embodiment of an electrical power source for a portable electronic device is shown in FIG. 4. In this embodiment, a fuel cell 400 and a fuel tank 402 are positioned with a TE module 404 therebetween. The orientation of the TE module 404 is such that a first surface 404a of the TE module 404 is in thermal contact with a first surface 400a of the fuel cell 400, while a second surface 404b of the TE module 400 (and having the opposite thermal response), is in thermal contact with a surface 402a of the fuel tank 402.

The first thermal surface 404a and the second thermal surface 404b, in this example, are commonly referred to as the "hot" side and the "cold" side. Depending on the application, temperatures experienced, and the direction of current flow through the TE module 404, which of the first or second thermal surface 404a, 404b is the "hot" side and which is the "cold" side may be different.

By locating the TE module 404 between (and in direct thermal contact with) the fuel cell 400 and fuel tank 402, relative thermal control may be implemented therebetween in a passive manner. That is, heat may be "passively" managed without actively controlling the operation of the TE module 404, or without supplying power to the TE module 404 from a power supply, or both. In a typical mode of operation, heat between the fuel cell 400 and fuel tank 402 is passively regulated in that the TE module 404 operates without being actively controlled by any other component. Further, the TE module 404 may passively regulate heat even though, in some cases, the TE module 404 may actively generate electric power. Since there is a relationship between the thermal differential across the TE module 404 and electrical power (in the form of electrical power flowing from one side of the TE module 404 to the other), the arrangement of FIG. 4 may function in different modes, depending on the relative temperatures of the fuel cell 400 and the fuel tank 402, and what the desired temperatures are for the fuel cell 400 and fuel tank 402.

Moreover, in some embodiments the power flowing from one side of the TE module 404 to the other side may be regulated to control the relative temperatures of the fuel cell 400 and fuel tank 402, generally as desired.

In some embodiments, one benefit of the embodiment shown FIG. 4 is that the TE module 404 may not need a separate electrical power supply to regulate the temperatures of the fuel cell 400 and fuel tank 402. In particular, under certain operating conditions, it may be possible to reject heat from one of the fuel cell 400 and fuel tank 402 while absorbing heat from the other of the fuel cell 400 and fuel tank 402 in order to maintain a desired temperature for the fuel cell 400 and fuel tank 402.

Under some such circumstances, the TE module 404 may accomplish the task of regulating the temperatures of the fuel cell 400 and fuel tank 402 while generating electrical power, rather than consuming electrical power. In such cases, the electrical node 408 may include an energy storage device (e.g. a battery) for storing the generated power, or be adapted to deliver surplus electrical energy (e.g. supplemental electrical energy not used for temperature management) to another part of the portable electronic device (e.g. for powering a display, a processor, etc.).

In some embodiments, the electrical node 408 may include an electrical load (which could be fixed or variable in various embodiments), or other means of reducing the resulting electrical power. This may be beneficial to limit the respective heat absorption and rejection at the two sides 404a, 404b of the TE module 404 and thereby limit its heating/cooling effect on the fuel cell 400 and fuel tank 402.

In embodiments where additional relative heating and cooling may be desired, the electrical node 408 may include a current source power supply (or other power supply) that is operable to augment the current between the two sides 404a, 404b of the TE module 404, thereby increasing the temperature differential between the two sides 404a, 404b.

As mentioned above, the embodiment shown in FIG. 4 may provide the advantage that a supply of electrical energy may not always be required to regulate the temperature of the fuel cell 400 and fuel tank 402. While in some cases this may require a more complicated control system (for example, in comparison to the controller 312 shown in FIG. 3), this may also lead to relative energy savings as well.

That is, while the heating and cooling functions of the embodiment shown in FIG. 3 may sometimes require an input of electrical energy (e.g. from a power supply provided by the electrical node 408), under certain operating conditions the relative heating/cooling arrangement of the TE module 404 can function as a heat exchanger between the fuel cell 400 and fuel tank 402 such that no electrical energy may be required to regulate temperature; and in fact under particular operating conditions the TE module 404 may function as an electrical energy generator and generate surplus electricity.

As shown in FIG. 4, a controller 412 may be used to monitor the temperature of the fuel cell 400 and fuel tank 402 via temperature sensors 414 and 416, respectively, and may receive other inputs from other sensors 418, such as an ambient temperature sensor, a humidity sensor, and so on. An output from the controller 412 to electrical node 408 may be used to control the TE module 404.

As will be appreciated, the electrical node 408 may include one or more electrical circuits having different circuit components and modes of operation, depending on whether a current is being regulated, is being generated, or is being used for energy recovery.

However, the embodiment shown in FIG. 4 may be somewhat limited in that it may not be operable to easily heat both the fuel cell 400 and fuel tank 402 at the same time, or cool both the fuel cell 400 and the fuel tank 402 at the same time.

Figure 5:
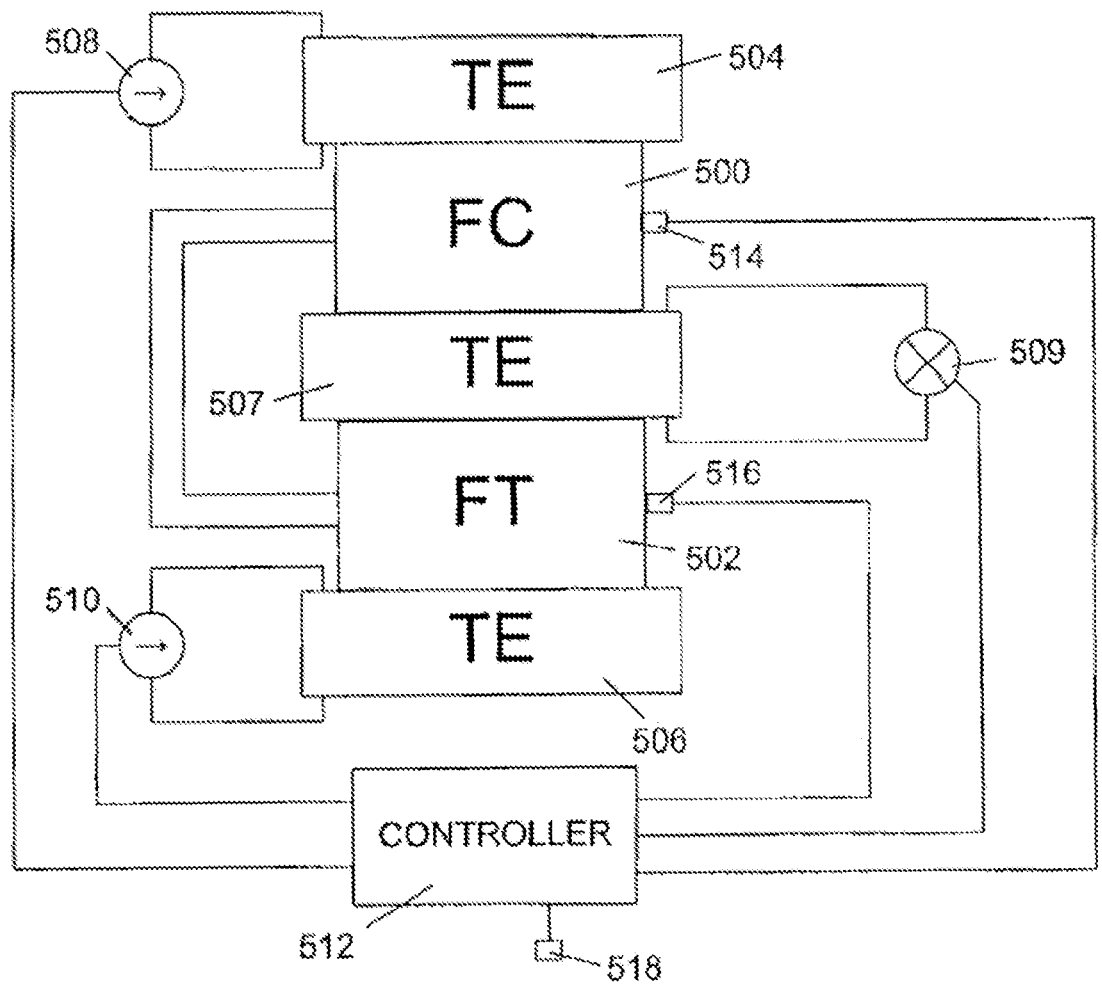
FIG. 5 is a schematic view of a fuel cell and fuel tank in thermal contact with a shared thermoelectric module and separate thermoelectric modules.

Accordingly, shown in FIG. 5 is an embodiment with a fuel cell 500 and a fuel tank 502 that each has its own respective separate TE module 504, 506, as well as a shared TE module 507 located between the fuel cell 500 and fuel tank 502.

In this embodiment, each of the fuel cell 500 and fuel tank 502 can be individually heated or cooled using the individual separate TE modules 504, 506. Furthermore, the energy-conserving aspects of the shared TE module 507 can also be leveraged.

Thus, in an operating condition where it is desirable to heat one of the fuel cell 500 and fuel tank 502 while cooling the other, the TE module 507 can be used to provide a relative heat exchange at little or no overall energy cost. However, the ability for overall independent thermal management of the fuel cell 500 and fuel tank 502 (including the ability to independently heat or cool both the fuel tank 500 and fuel cell 502 at the same time) is nevertheless retained by having separate dedicated TE modules 504, 506.

Similar to the embodiment shown on FIG. 4, the embodiment shown in FIG. 5 may include a power supply for each TE module, namely a first power supply 508 associated with first TE module 504, and a second power supply 510 associated with second TE module 506.

A controller 512 may control the power supplies 508, 510, as well as the electrical node 509 (which may be similar to or the same as electrical node 408 of FIG. 4 in that it may comprise a circuit capable of actively or passively regulating the power of the shared TE module 507, or receiving power therefrom).

The controller 512 may also receives input from one or more temperature sensors 514 and 516, which measure the temperature of the fuel cell 500 and the fuel tank 502, as well as from one or more other sensors 518, such as an ambient temperature sensor, a humidity sensor, and so on. In response to these signals, the controller 512 may determine the heating or cooling needs of the fuel cell 500 and fuel tank 502, and control the separate TE modules 504, 506 and shared TE module 507. In some embodiments, the shared TE module 507 may be used whenever practical so as to increase the potential energy savings.

Figure 6:
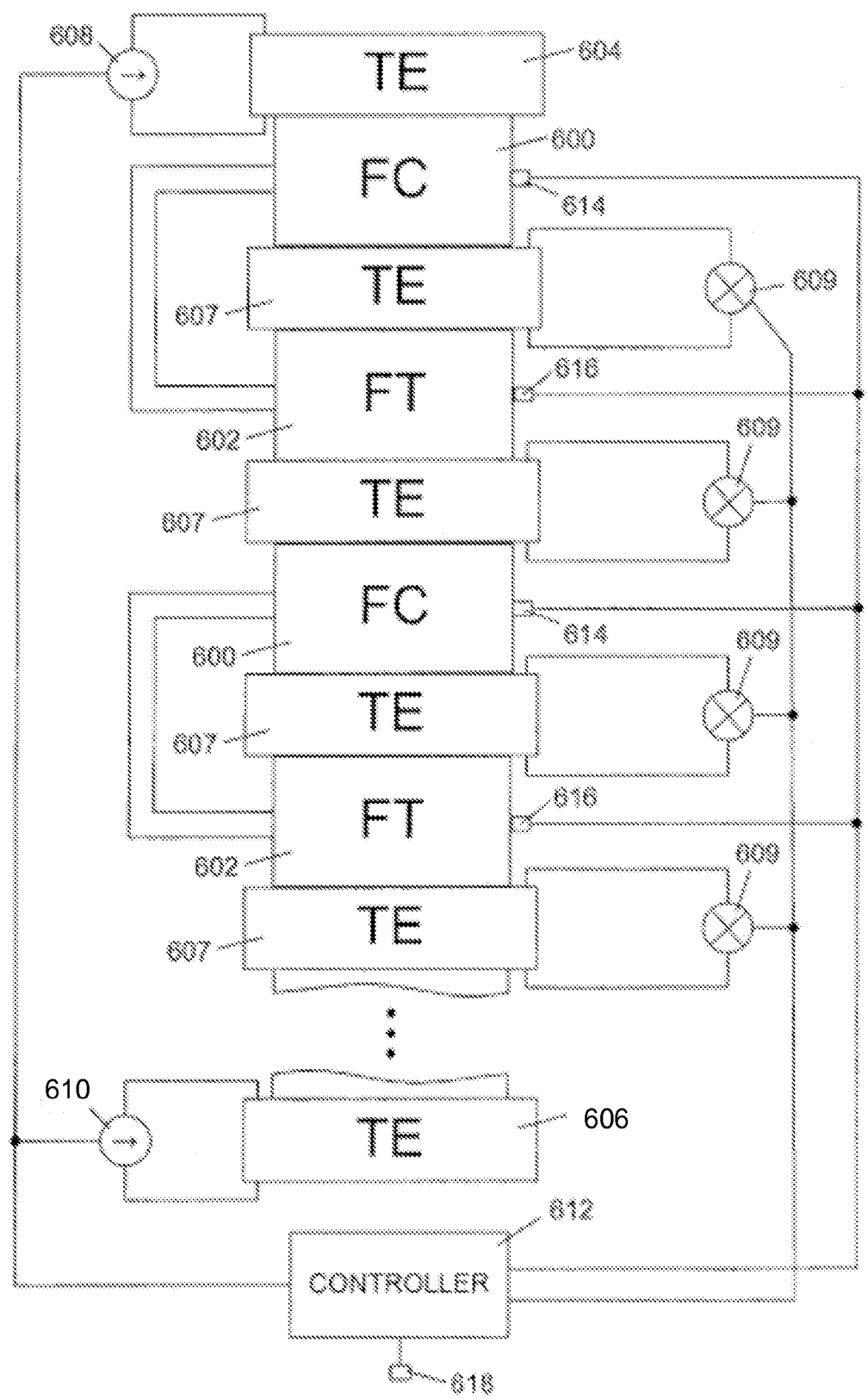
FIG. 6 is a schematic view of a series of fuel cells and fuel tanks in thermal contact with a plurality of shared and separate thermoelectric modules.

One possible extension of the embodiment shown in FIG. 5 is a series of fuel cells and fuel tanks having multiple interspersed TE modules, either in a shared cooling/heating capacity, or on an individual separate basis. A sample embodiment is shown in FIG. 6.

In this embodiment, a series of alternating fuel cells 600 and fuel tanks 602 are arranged with a plurality of shared TE modules 604 interspersed therebetween. The TE modules 607 operate as a shared heating/cooling devices like the TE modules 507 described above.

Separate TE modules 604, 606 are also shown that are similar to the individual TE modules 504, 506 described above in that they are in contact with only one fuel cell 600 or fuel tank 602. Therefore, the TE modules 604, 606 can operate as independent heaters or coolers for the fuel cell 600 and fuel tank 602.

To this end, the separate TE modules 604, 606 may be connected to power supplies 608, 610 while the shared TE modules 607 may be connected to an electrical node 609 (which could also include a power supply). Each power supply 608, 610 and electrical node 609 may be controlled by controller 612, which may receive inputs from fuel cell temperature sensors 614, fuel tank temperature sensors 616 and other sensor 618, such as an ambient temperature sensor, a humidity sensor, and so on.

As shown in FIG. 6, a "chain" or pattern of fuel cells 600, fuel tanks 602 and shared TE modules 607 may be repeated for as many stages as desired. This arrangement may allow for efficient usage of TE modules 607 as thermal control components for a portable electronic device powered by an electrical power source comprising a fuel cell.

In the embodiment shown in FIG. 6, the fuel cells 600 are arranged so as to alternate with the fuel tanks 602, and there is generally one fuel tank 600 for each fuel cell 602. However, this arrangement may be changed as desired to include more than one fuel tank 602 per fuel cell 600, more than one fuel cell 600 per fuel tank 602, or the fuel cells 600 and fuel tanks 602 may be arranged in different sequences and configurations.

Depending on various design criteria, such as space requirements and operating temperatures for the fuel cells 600 and fuel tanks 602, it may be more thermally efficient in some embodiments if, for example, a shared TE module 607 is located between two fuel cells 600 or two fuel tanks 602, rather than between a fuel cell 600 and a fuel tank 602.

Moreover, additional separate TE modules 604, 606 may be located in contact with one or more of the fuel cells 600 or fuel tanks 602 to provide additional heating/cooling control as desired.

The arrangements shown in FIGS. 5 and 6 could in some embodiments be used for a gradual startup operating conditions (discussed below), with a single fuel cell, a single fuel tank, or one or more pairs of fuel cells and fuel tanks.

In some such arrangement, the heat generated by a first fuel cell, a first fuel tank or first pair of fuel cells and fuel tanks may be used to generate electrical power to assist in gradually bringing another fuel cell, another fuel tank or other pairs of fuel cells and fuel tanks to desired operating temperature.

Such an arrangement may be particularly beneficial in that the heat generated by fuel cells and fuel tanks already in operation may be used to bring or assist in bringing other fuel cells and fuel tanks online.

Although the arrangements of FIG. 6 depict the shared TE modules 607 generally "sandwiched" between and in alignment with the fuel cells 600 and fuel tanks 602, this particular arrangement is used for clarity purposes only. In particular, the position of the TE modules 607 could be shifted, and at least one TE module 607 may not be entirely sandwiched between the fuel cells 600 and fuel tanks 602 so as to allow some breathing area to that TE module 607.

Figure 7:
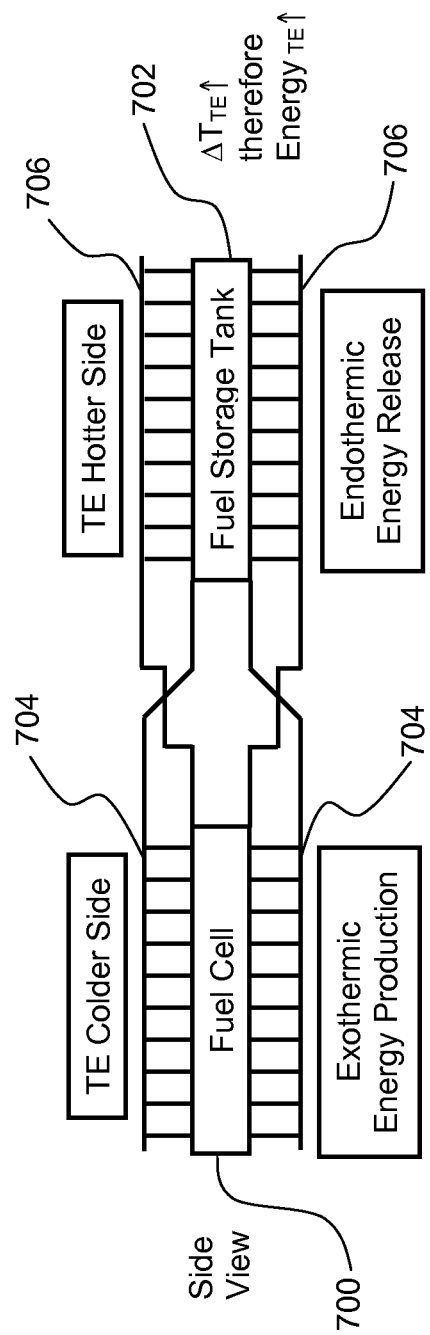
FIG. 7 is a schematic view of cross-connected thermoelectric modules in thermal contact with a fuel cell and a fuel tank.

Turning now to FIG. 7, illustrated therein is a schematic view of interconnected thermoelectric modules on a fuel cell and fuel tank in accordance with yet another embodiment. In the description of this particular configuration, it is assumed that the reaction in the fuel cell 700 is exothermic, while reaction in the fuel tank 702 is endothermic. However, it may also be possible in some embodiments to use an endothermic fuel cell 700 and an exothermic fuel tank 702, in which case in the following description would be reversed.

This particular configuration uses a pair of electrically interconnected, and more particularly cross-connected, thermoelectric modules 704, 706, which may passively improve the efficacy of the reactions in the fuel cell 700 and fuel tank 702 with respect to the environmental conditions to obtain desired operating conditions. To this end, at least one of the thermoelectric modules 704 is in thermal contact with the fuel cell 700, while at least one other thermoelectric module 706 is in thermal contact with the fuel tank 702.

Each thermoelectric module 704, 706 may be adapted to generate electric power that is proportional to a temperature difference between its cold side and its hot side, and furthermore may be adapted to receive electrical power to create a temperature difference between the two sides thereof. Accordingly, interconnecting the pair of thermoelectric modules 704, 706 may passively regulate operation of the fuel cell 700 and fuel tank 702 and further may passively extend their normal operating range (e.g. the temperature ranges in which they may operate).

Generally, reactions in the fuel cell 700 and fuel tank 702 follow three operating phases: a startup phase, a normal operating phase and a hot phase. During a startup phase, as the fuel cell 700 is exothermic (in this embodiment), heat generated by the fuel cell 700 may be absorbed and transformed by the thermoelectric module 704 in thermal contact therewith to produce electrical power. This electrical power may then be provided to the other thermoelectric module 706 to heat the fuel tank 702.

In some embodiments, in the startup phase, the fuel cell 700 may be heated (e.g. using the thermoelectric module 704) to increase permissivity and ionic conductivity, which may be useful for self-starting the exothermic reaction in the fuel cell 700. Thus, the interconnection of the thermoelectric modules 704, 706 may allow for startup of the fuel tank 702 in environmental conditions in which the fuel tank 702 would not normally be able to operate, thereby passively extending the operating range (e.g. temperature range) of the fuel cell 700. This may be particularly useful in cold environments where the fuel in the fuel tank 702 may be quite cold (or may even experience an icing condition).

The temperatures at which "icing" may occur can vary depending on the particular fuels being used, the residues created by the fuel cell, and other characteristics of the fuel cell 700 and fuel tank 702. In particular, the term "icing" may refer more generally to temperatures at which ice crystals or other solids may tend to form within the fuel, the residue, etc. For example, where water is a residue, temperatures around or below 0 degrees Celsius may lead to icing problems.

After startup, the fuel cell 700 and fuel tank 702 gradually progress to the normal operating phase, wherein the fuel cell 700 and fuel tank 702 reach their desired operating conditions and temperatures. During the normal operating phase, the thermoelectric modules 704, 706 tend to passively regulate the reactions in the fuel cell 700 and fuel tank 702 by taking advantage of the heat generated by the fuel cell 700, heat absorbed by the fuel tank 702 and environmental conditions in which the fuel cell 700 and fuel tank 702 are operating to regulate temperature. Thus, in a cold environment, the thermoelectric modules 704 may continue to transform heat generated by the fuel cell 700 into electrical power, which is then transferred to the thermoelectric module of the fuel tank 702 so as to warm the fuel tank 702 (for maintaining the fuel tank 702 within its normal operating temperature). In a warmer environment, the thermoelectric modules of the fuel tank 702 may produce electrical power that is applied to the thermoelectric module 704 of the fuel cell 700 for cooling the fuel cell 700.

This configuration may thus passively maintain the fuel cell 700 and fuel tank 702 in normal operating phase in environmental conditions (e.g. ambient temperatures, etc.) that may otherwise have negatively affected the desired operation of the fuel cell 700 and fuel tank 702.

In a hotter environment, on the other hand, or after being operable for a period of time, the fuel cell 700 may reach the "hot phase". In this case, the interconnected thermoelectric modules 704, 706 may then passively cool the fuel cell 700. For example, the thermoelectric module 706 in thermal contact with the fuel tank 702 may produce electrical power that is provided to the thermoelectric module 704 in thermal contact with the fuel cell 700 for cooling the fuel cell 700. Thus, when in the "hot phase", the interconnected thermoelectric modules 704, 706 may passively cool the fuel cell 700, thereby inhibiting or reducing the negative effect of a hot environment on the exothermic reaction of the fuel cell 700.

When the fuel cell 700 and fuel tank 702 are adjacently located, or located on opposite ends of fuel cell 700 and fuel tank 702 stacks (as shown on FIGS. 5 and 6 for example), the thermoelectric modules 704, 706 may be electrically interconnected (i.e. a hot side of one of the thermoelectric module 704 is put in thermal contact with the fuel cell 700, while a cool side of the other thermoelectric module 706 is in thermal contact with the fuel tank 702).

In some embodiments, multiple pairs of electrically interconnected thermoelectric modules 704, 706 could be used simultaneously to increase the passive regulation of one or more fuel cell 700 and fuel tank 702.

In some other embodiments, for configurations with multiple fuel cells and multiple fuel tanks, it may be possible to electrically interconnect only one pair of thermoelectric modules so as to start one of the fuel cells or fuel tanks, and then rely on the heat generated therefrom (as previously described) to start the other fuel cells and fuel tanks.

Generally, to increase thermal contact between one or more fuel cells, fuel tanks and thermoelectric modules, various techniques may be used. For example, the thermoelectric modules could be shaped so as to correspond to a surface or several surfaces of one or more fuel cells and fuel tanks so as to encourage conductive heat transfer therebetween. Another option to increase thermal contact may be to use an adhesive bonding or gel, particular one that has good thermal conductivity. Another option may be compress the thermoelectric modules against with the corresponding fuel cell or fuel tank ensuring good contact therebetween. In some embodiments, it may also be possible to solder or otherwise join a thermoelectric module to a corresponding fuel cell or fuel tank.

At least some of the above concepts, and variations thereof, may realize one or more benefits. For example, many electronic portable devices, such as those mentioned previously (e.g., a mobile phone, smart phone, personal digital assistant, tablet computer) are sized and shaped to be held in one or more human hands and may be used in different operating environments (e.g. in warm environments, in cold environments, etc.). For such small electronic portable devices, using fuel cells may present challenges that are very different in magnitude and kind from those faced by larger fuel-cell-powered devices (e.g. industrial-sized fuel cells or fuel cells in automobiles).

For example, some concepts as described herein may assist with miniaturization or space-saving demands (or both) that are applicable to handheld electronic portable devices. In particular, temperature management may be much more important in a portable electronic device that may be in contact with or proximate to a person's skin or clothing.

Furthermore, some concepts as described herein may have the potential to support systems for supplying energy consistent with the needs of portable electronic portable devices during ordinary operation (e.g. sending and receiving electronic messages, voice communication, consuming media content such as music and videos, etc.).

Furthermore, some concepts as described herein may cooperate with a number of other power-related technologies. For example, some concepts described herein may help enable a portable electronic device to be powered by a plurality of energy storing elements, such as one or more fuel cells, batteries, super-capacitors, and other energy storage devices. Some concepts as described herein may also be adapted to work in concert with a variety of shapes, sizes and configurations of portable electronic devices.

Some embodiments as described herein may allow portable electronic devices to be operated in various operating conditions (e.g. in hot environments, in cold environments, etc.) by controlling or regulating the temperatures of one or more fuel cells and one or more fuel tanks using one or more thermoelectric modules.

In some embodiments, various materials and combinations of materials may be used to make some or all of the components as described herein. For example, one or more components as described herein may be made of one or more materials such as polymers (including thermoplastics and thermosets, ABS, rubbers, silicone, etc.), metals (such as steel, aluminum, magnesium, etc.), ceramics, composites (e.g. carbon fiber, Kevlar, etc.), and so on. In some embodiments, combinations of material may be used to provide desired aspects such as structural rigidity, toughness, reactivity, and so on. For example, metal components (e.g. elements of a TE module) may be covered by one or more polymer components so as to inhibit contact between the metal components and the fuel in the fuel tanks or fuel cells (or both), which could be undesirable as certain fuels may react with certain metals.

In some embodiments, the size and shape of at least some of the components as described herein can be varied to accommodate portable electronic devices of various shapes and sizes.

While some embodiments herein have been shown and described with reference to different aspects thereof, it will be recognized by those skilled in the art that various changes in form and detail may be made herein without departing from the spirit and scope of the invention as defined by the appended claims.

The invention claimed is:

1. An electrical power source for a portable electronic device, the electrical power source comprising:
   a fuel cell that receives fuel and generates therefrom electrical power for powering at least one component of the portable electronic device;
   a fuel tank that provides fuel to the fuel cell;
   two thermoelectric modules including:
      a shared thermoelectric module that is in direct physical contact and direct thermal contact with both the fuel cell and the fuel tank and which passively regulates heat transfer between the fuel cell and fuel tank without electrical power being supplied to the shared thermoelectric module, and
      a separate thermoelectric module that is in direct physical contact and direct thermal contact with only one of the fuel tank or fuel cell for actively and independently adjusting the temperature of that fuel cell or fuel tank;
   at least one temperature sensor for monitoring the temperature of the fuel cell and fuel tank; and
   a controller that monitors the temperatures of the fuel cell and fuel tank using the at least one temperature sensor and which selectively powers the separate thermoelectric module to maintain the temperatures of the fuel cells and fuel tanks within a desired operating range.

2. The electrical power source of claim 1, wherein the controller determines when the fuel cell and fuel tank are below a desired operating temperature and then initiates a heating cycle for the separate thermoelectric module to inhibit the formation of ice within the fuel cell and fuel tank.

3. The electrical power source of claim 1, wherein the controller determines when the fuel cell and fuel tank are above a desired operating temperature and then initiates a cooling cycle for the separate thermoelectric module.

4. A portable electronic device, comprising:
   at least one electronic component; and
   an electrical power source for powering the at least one component, the electrical power source having:
   a one fuel cell that receives fuel and generates therefrom electrical power for powering the at least one component;
   a fuel tank that provides fuel to the fuel cell; and
   a plurality of thermoelectric modules, including:
   a shared thermoelectric module in direct physical contact and direct thermal contact with both the fuel cell and fuel tank, the shared thermoelectric module passively regulating the temperature of the fuel cell and the fuel tank without electrical power being supplied to the shared thermoelectric module; and
   a separate thermoelectric module in direct physical contact and direct thermal contact with one of the fuel cell or the fuel tank, the separate thermoelectric module for actively regulating the temperature of the one of the fuel cell or fuel tank; and
   a controller for:
   determining whether the temperatures of the fuel tank and fuel cell are at or near a temperature at which ice crystals may tend to form within the fuel cell or fuel tank,
   and
   if so then initiating a heating cycle for the separate thermoelectric module by supplying power to the separate thermoelectric module to inhibit the formation of ice within the fuel cell and fuel tank.

5. An electrical power source for a portable electronic device, the electrical power source comprising:
   a fuel cell that receives fuel and generates electrical power therefrom for powering at least one component of the portable electronic device;
   a fuel tank that stores the fuel for the fuel cell;
   two thermoelectric modules, each thermoelectric module having a first surface, the two thermoelectric modules comprising:
   i) a shared thermoelectric module, with the first surface thereof in direct physical contact and direct thermal contact with outer surfaces of both the fuel cell and the fuel tank passively regulate heat transfer between the fuel tank and fuel cell, and
   ii) a separate thermoelectric module with the first surface thereof in direct physical contact with another outer surface on only one of the fuel tank or fuel cell for independently adjusting the temperature of that fuel cell or fuel tank;
   at least one temperature sensor that monitors the temperature of the at least one fuel cell and at least one fuel tank; and
   a controller that receives information about the temperature of the at least one fuel cell and at least one fuel tank from the at least one temperature sensor, determines whether the temperature of the fuel tank or fuel cell is at or near a temperature at which ice crystals may tend to form within the fuel cell or fuel tank, and if so then initiates a heating cycle for the separate thermoelectric module by supplying power to the separate thermoelectric module.

* * * * *